United States Patent [19]
Vara et al.

[11] Patent Number: 5,206,320
[45] Date of Patent: Apr. 27, 1993

[54] CURABLE FLUOROCOPOLYMER WITH DUAL FUNCTION VINYL ETHER

[75] Inventors: Fulvio J. Vara, Chester; James A. Dougherty, Pequannock, both of N.J.

[73] Assignee: ISP Investments Inc., Wilmington, Del.

[21] Appl. No.: 898,605

[22] Filed: Jun. 15, 1992

Related U.S. Application Data

[63] Continuation-in-part of Ser. No. 765,296, Sep. 25, 1991.

[51] Int. Cl.$^5$ .............................................. C08F 12/20
[52] U.S. Cl. ..................................... 526/249; 526/255
[58] Field of Search ................................ 526/249, 255

[56] References Cited

FOREIGN PATENT DOCUMENTS 63-110265  5/1988  Japan ..................................... 526/249

Primary Examiner—Joseph L. Schofer
Assistant Examiner—N. Sarofim
Attorney, Agent, or Firm—Walter Katz; Marilyn J. Maue; Joshua J. Ward

[57] ABSTRACT

A rapidly curable fluorocopolymer comprises (a) 40 to 60 mole % of fluoroolefin units, (b) 8 to 60 mole % of the monovinyl ether of cyclohexanedimethanol units and (c) 5 to 45 mole % of alkyl vinyl ether units, wherein the mole % of a = b + c. The vinyl ether group provides an enhanced polymer Tg and a primary hydroxy site in the backbone of the polymer for effective and rapid crosslinking upon curing with isocyanates. The presence of (b) +(c) in substantially equimolar amounts with (a) provides coatings having the desired hardness without brittleness, and in suitable ratio for reaction copolymerization with (a).

4 Claims, No Drawings

CURABLE FLUOROCOPOLYMER WITH DUAL FUNCTION VINYL ETHER

CROSS-REFERENCE TO RELATED PATENT APPLICATION

This application is a continuation-in-part of copending application, Ser. No. 765,296, filed Sep. 25, 1991.

BACKGROUND OF THE INVENTION

1. Field of the Invention

This invention relates to a curable fluorocopolymer, and, more particularly, to compositions which have a dual function vinyl ether therein containing primary hydroxyl groups which cure rapidly to form hard but not brittle coatings.

2. Description of the Prior Art

Copolymers of a fluoroolefin, a cyclohexyl vinyl ether, an alkyl vinyl ether and a hydroxyalkyl vinyl ether have been described by Yamabe in U.S. Pat. No. 4,345,057 as being useful as a resin for paint. However, several monomers are required during manufacture to prepare the curable fluorocopolymer which, however, increases the complexity of the process.

Asahi Glass, in JP 3110-265-A described a coating composition containing 10 mole % of an alkyl vinyl ether containing a secondary hydroxyl group, optionally, a second vinyl ether.

Accordingly, it is an object of the present invention to provide a curable fluorocopolymer with a dual function vinyl ether containing primary hydroxyl groups which cures rapidly to foam hardened coatings.

Another object herein is to prepare a curable fluorocopolymer with vinyl ether-containing dual function Tg-enhancing and cross-linkable hydroxy groups in the same molecule.

A specific object of the invention is the use of a vinyl ether monomer for the manufacture of a curable fluorocopolymer which has both a cyclohexyl alkyl group for Tg-enhancement and a primary hydroxy group for provision of a crosslinking site on the backbone of the polymer.

These and other objects and features of the invention will be made apparent from the following description thereof.

SUMMARY OF THE INVENTION

What is provided herein is a rapidly curable fluorocopolymer comprising (a) 40 to 60 mole % of fluoroolefin units, (b) 8 to 60 mole % of the monovinyl ether of cyclohexanedimethanol (CHMVE) which contains primary hydroxyl groups only, and (c) 5 to 45 mole % of alkyl vinyl ether units, wherein a = b + c. The CHMVE component provides the dual function of Tg-enhancement and crosslinking primary hydroxyl site on the backbone of the copolymer. The fluorocopolymer can be manufactured easily and then cured very rapidly at room temperature with an isocyanate or melamine to form glossy finishes with high chemical resistance and excellent weatherability.

The presence of (b) +(c) in substantially equimolar amounts with (a) provides coatings having the desired hardness without brittleness, and in a suitable ratio for reaction copolymerization with (a).

DETAILED DESCRIPTION OF THE PREFERRED EMBODIMENTS

In the curable fluorocopolymer of the present invention, the (b) component, which is a single vinyl ether, CHMVE, has both a cyclohexyl group, which will substantially increase the Tg of the polymer, and a primary hydroxyl radical, which will provide a rapid crosslinking site along the backbone of the polymer. Suitably CHMVE is present in an amount of about 8 to 60 mole % of the composition. The fluorocopolymer (a) is present in an amount of 40 to 60 mole % of fluoroolefin units; and (c) is 5 to 45 mole % of alkyl vinyl ether units. The mole % of (a) = (b) + (c).

In this composition, when the content of the fluoroolefin units in the polymer is low, its weatherability is poor. When the content of fluoroolefin units is too high, it is not advantageous in view of difficulties in reproducibility. On the other hand, when the content of the cyclohexyl vinyl ether units is low, the hardness of the finish is disadvantageously low. Also, when the content of alkyl vinyl ether units is too low, flexibility is disadvantageously low.

It is important in the copolymer of the present invention for the CHMVE to contain primary hydroxy units in view of an improvement in rapidity of curability without deterioration of various useful characteristics as resin for paint. That is, when the content of primary hydroxy units from CHMVE is too high, the copolymer is soluble in only specific solvents, e.g. alcohols. Therefore, applicability as a resin for solution type paint is limited. Moreover, the flexibility of the cured finish is reduced, and gelation time (pot life) of the copolymer in the presence of a curing agent is reduced. When the hydroxy groups in CHMVE is too low, its curing property deteriorates resulting in an increase in the curing time and a reduction in the chemical resistance of the finish.

In the present invention, perhaloolefins, especially chlorotrifluoroethylene or tetrafluoroethylene, are used as the fluoroolefin, and alkyl vinyl ethers having a $C_2$–$C_8$ straight or branched alkyl group, especially a $C_2$–$C_4$ alkyl group, are used as the alkyl vinyl ethers. The fluoroolefin and the alkyl vinyl ether can also be a mixture of two or more compounds.

The curable fluorocopolymer of the present invention can incorporate comonomer units other than the above-mentioned monomer units, in an amount up to 30 mol %. Suitable comonomers include olefins such as ethylene, propylene and isobutylene; haloolefins such as vinyl chloride and vinylidine chloride; unsaturated carboxylic acid esters such as methyl methacrylate and vinyl carboxylate such as vinyl acetate and vinyl n-butyrate, and mixtures thereof.

The copolymer of the present invention has an inherent viscosity measured at 30° C. in tetrahydrofuran in the non-cured condition of about 0.05 to 2.0 dl/g. When the viscosity is too low, the mechanical strength is low, whereas, when it is too high, the resin concentration in paint must be low to provide a suitable paint viscosity, and then processing of a solution type paint is difficult.

The copolymer of the present invention can be produced by copolymerization of a mixture of monomers in specific ratios in the presence or absence of a polymerization medium using a polymerization initiator or ionizable radiation.

The polymerization initiators can be water soluble or oil soluble depending upon the polymerization system or the polymerization medium. Suitable water soluble initiators include inorganic initiators, for example, persulfate such as potassium persulfate; hydrogen peroxide; and redox initiators as combination of said compounds and a reducing agent such as sodium hydrogen sulfite and sodium thiosulfate, and a mixture of these compounds with a small amount of iron, ferrous salt or silver nitrate; organic initiators, for example, dibasic acid peroxides such as disuccinic acid peroxide, diglutaric acid peroxide and monosuccinic acid peroxide and azobisisobutylamidine dibasic acid salts. The oil soluble initiators include peroxyester type peroxides such as t-butylperoxyisobutyrate and t-butylperoxyacetate; dialkylperoxydicarbonates such as diisopropylperoxydicarbonate; benzoylperoxide and azobisisobutyronitrile.

The amount of polymerization initiator used in the copolymerization will depend upon the kind selected and copolymerization conditions; usually it is in a range of 0.005 to 5 wt. %, especially 0.05 to 0.5 wt. %, based on total monomers.

The reaction system in the copolymerization is not critical; bulk polymerization, suspension polymerization, emulsion polymerization and solution polymerization may be used. In view of the stability of the polymerization reaction and the easy separation of the resulting copolymer, it is preferred to use emulsion polymerization in an aqueous medium or the solution polymerization using a solvent such as alcohols as t-butanol, esters and saturated halohydrocarbons having at least one fluorine atom.

When the copolymerization is carried out in an aqueous medium, it is preferable that a basic buffering agent be added and to maintain the pH of the solution at a value of at least 4, preferably, at least 6, during the copolymerization. In the case of solution polymerization, it is also preferred to add a basic material. The process of the present invention may be carried out in a batch system, a semicontinuous system, or a continuous system. During the copolymerization, the temperature is set in a range of $-30°$ to $+50°$ C., the optimum value depending upon the kind of polymerization initiator and the polymerization medium used. When the copolymerization is carried out in an aqueous medium, it is usually about 0° to 100° C., preferably about 10° to 90° C. The reaction pressure suitably is in a range of 1 to 100 kg/cm$^2$, preferably 2 to 50 kg/cm$^2$.

In order to control the inherent viscosity of the resulting copolymer within the desired range, it is preferable that the copolymerization be carried out in the presence of a suitable chain transfer agent.

The copolymer of the present invention has primary hydroxyl groups derived from CHMVE units and is rapidly curable with a curative such as a melamine resin, a urea resin and a polybasic acid. Suitable melamine resins include butylated melamine resin, methylated melamine resin and epoxymelamine resin; suitable urea resins include methylated urea and butylated urea; and suitable polybasic acids include long chain aliphatic dicarboxylic acids, aromatic polycarboxylic acids or anhydrides thereof, and blocked polyisocyanates. When melamine resin or urea resins are used, curing may be accelerated with an acidic catalyst.

The copolymer of the present invention can be cured at room temperature with a polyisocyanate. Non-discoloring diisocyanates such as hexamethylene-diisocyanate and isophoronediisocyanate and adducts thereof are especially effective as polyisocyanates. Curing is carried out at room temperature with an isocyanate, which can be accelerated by an addition of a known catalyst such as dibutyl tin dilaurate.

Solution type paints can be formulated with the copolymer of the present invention and various solvents including aromatic hydrocarbons such as xylene and toluene; alcohols such as n-butanol; esters such as butyl acetate; ketones such as methyl isobutyl ketone; glycol ethers such as ethyl cellusolve; and various commercial thinners.

The copolymer and solvent are mixed using conventional equipment for the preparation of paints such as a ball mill, a paint shaker, a sand mill, a jet mill, a 3-roll mill or a kneader. In such operation, it is possible to add a pigment, a dispersant, a thickener, a leveling agent, an anti-gelling agent and or an ultraviolet absorbent.

When the copolymer of the present invention is used for a preparation of thermosetting paint such as a baking enamel, melamine resins, urea resins, polybasic acids, and anhydrides thereof, and blocked polyisocyanates can be admixed in the mixing step to provide a one-component coating.

When the copolymer is used for the preparation of a non-thermal curable paint using a non-blocked polyisocyanate, these resins are added separately to form a two-component coating. It is possible to prepare paints which can be non-thermally cured in several hours to several days.

The copolymer of the present invention can be used as resin for paint to provide a film having a finish which exhibits excellent hardness, gloss, flexibility, and chemical stain and weathering resistance.

The present invention will be further illustrated by certain examples and references which are provided for purposes of illustration only and are not intended to be limiting the present invention.

EXAMPLE 1

Into a 200 cc stainless steel autoclave equipped with a stirrer (durable pressure of 25 kg/cm$^2$), 116 g. of t-butanol, 47.6 g. of cyclohexanedimethanol monovinyl ether (CHMVE), 15.8 g. of ethyl vinyl ether (EVE), 0.69 g. of potassium carbonate and 0.06 g. of azobisisobutyronitrile (AIBN) are charged and solidified with liquid nitrogen and deaerated to remove the dissolved air. Then, 36 g. of chlorotrifluoroethylene (CTFE) is charged in the autoclave and the autoclave is gradually heated to 65° C. where a pressure of 4.5 kg/cm$^2$ was observed. The mixture is stirred for 7.2 hours until the pressure is reduced to 2.2 kg/cm$^2$, when the autoclave is cooled with water to stop the reaction. When the autoclave is cooled to room temperature, the unreacted monomers are purged and the autoclave is opened. The resulting polymer solution is poured into water to precipitate the polymer and then, the polymer is heated and dried and recovered. The yield of the polymer is 35.0 g.; the concentration of the polymer is 23.2%, conversion of monomers is 53.0%, and the average polymerization velocity is 31.8% g/liter hour.

The resulting polymer has an inherent viscosity ($\eta$) of about 0.39 dl/g. at 30° C. in tetrahydrofuran and a thermal decomposition temperature (initiation of weight loss is observed in air at an increasing temperature rate of 10° C./m.) (Tg) is 236° C. and the glass transition temperature (DSC at an increasing temperature rate of 10° C./m.) is 45° C.

Into a mixed solvent of 4 g. of xylene and 12 g. of methyl isobutyl ketone, 10 g. of the resulting copolymer is dissolved and 4.2 g. of titanium oxide (R-960 ®manufactured by E.I. duPont) is added and the mixture is mixed for 1 hour by a paint shaker. The resulting paint shows a good dispersed state (grind gauge less than 5 $\mu$). The paint is admixed with 0.8 g. of hexamethylene diisocyanate, and 1.5 $\times 10^7$ g. of dibutyl tin dilaurate and the mixture is coated on a chromate treated aluminum substrate by an applicator. About 7 hours after the application, the finish is tack-free. Three days later, a hard film having a thickness of 20 $\mu$is obtained which is not abraded by wiping with xylene. The gloss of the surface is about 77% in 60° C. –60° specular reflectance. The finish is submitted to various tests and the results are shown in Table 1 below.

TABLE 1

| Test | Result |
| --- | --- |
| Xylene-rubbing (a) | >200 times |
| Marker stain resistance (b) | hardly stained |
| Cross-cut | 100/100 |
| Cross-cut boiling | 100/100 |
| Scratch Erichsen distensibility (5 mm) | good |
| DuPont Impact (1 kg. ¼" $\phi$) | 50 cm |
| T-bending | 1 T |
| Pencil hardness | 4 H |

(a) Number of rubs required to abrade the finish by use of xylene soaked gauze.
(b) Residual stain after wiping off the marker drawing by use of acetone soaked gauze.

EXAMPLE 2

Copolymerization is carried out in accordance with the process of Example 1 except that tetrafluoroethylene (TFE) is used instead of CTFE. The initial reaction pressure is 5.5 kg/cm$^2$, which is lowered to 2.5 kg/cm$^2$ after 5 hours when the reaction is stopped by quenching the reactor. 30 grams of the copolymer containing 0.29 CHMVE mole % is obtained. The inherent viscosity ($[\eta]$) is about 0.45 dl/g. and Tg of 27° C. is observed.

A paint is prepared from the copolymer according to Example 1 which is submitted to an ambient temperature cure which is complete after 3 days.

EXAMPLES 3 TO 6

Copolymerization were conducted in accordance with the process of Example 1, under the conditions listed in Table 2, which also show the reaction results together with some fundamental resin properties ($[\eta]$) Tg and CHMVE content.

TABLE 2

|  | Exp. 3 | Exp. 4 | Exp. 5 | Exp. 6 |
| --- | --- | --- | --- | --- |
| Components |  |  |  |  |
| (a) CTFE | 50 g. | 50 g. | 50 g. | 50 g. |
| (b) CHMVE | 65 g. | 95 g. | 68 g. | 68 g. |
| (c) EVE | 12 g. | 5 g. | 10 g. | — |
| Polymerization Conditions |  |  |  |  |
| Polymerization pressure (kg/cm$^2$) | 4.1–2.2 | 4.0–2.0 | 4.0–2.2 | 4.2–2.2 |
| Polymerization time (hr) | 8.0 | 9.0 | 8.0 | 7.0 |
| Polymer yield (g) | 32.0 | 30.0 | 36.5 | 37.7 |
| Properties of Coating |  |  |  |  |
| $[\eta]$ (dl/g) | 0.36 | 0.32 | 0.35 | 0.42 |
| Tg (°C.) | 35 | 40 | 45 | 35 |
| CHMVE content (mol %) | 37 | 51 | 47 | 47 |

EXAMPLE 7

In a 200 cc autoclave made of stainless steel and equipped with a stirrer, 120 g. of deoxidized water, 0.6 g. of ammonium perfluorononanoate, 12 g. of trifluoro-tri-chloroethane, 2.2 g. of disodium phosphate and 0.06 g. of ammonium persulfate is charged, and then, 25.2 mole % CHMVE is charged. The mixture in the autoclave is solidified with liquid nitrogen and deaerated and melted. This procedure is repeated twice, and then 50 g. of CTFE is charged.

The autoclave is gradually heated under stirring to 30° C. and the temperature is kept at 30° C. The pressure is 3.5 kg/cm$^2$. Three hours after initiation, a reduction in pressure is observed. The pressure decreases to about 1 kg/cm$^2$ in 9.0 hours after the initiation, and remains substantially constant thereafter. Ten hours after initiation, the autoclave is cooled with ice water to purge the monomers. The latex obtained in the reactor (concentration of 20.5%) was agglomerated with ethanol and the polymer was filtered, washed and dried to obtain 36 g. of white spongy solid. Conversion of monomers was 66% and the average polymerization velocity was 29 g/1.h. The resulting copolymer had a CHMVE content of 13.5 mol %; $[\eta]$ of 0.52 dl/g.; and Tg of 47° C.

In accordance with the process of Example 1, a paint is prepared by using the resulting polymer and curing at room temperature. The curing characteristics proves suitable for practical use.

EXAMPLE 8

The process of Example 1 is carried out using 34.8 g. of sec-butanol and 81.2 g. of t-butanol as a solvent for the polymerization and 0.30 g. of AIBN. The initial pressure in the polymerization is 4.4 kg/cm$^2$ and the pressure is gradually decreased until it reaches 0.65 kg/cm$^2$ after 13 hours following initiation. The autoclave then is cooled to terminate the polymerization. The product is concentrated by pouring the resulting polymerization solution into water while stirring, washing with methanol and drying at 65° C. under reduced pressure for 3 hours. 56.6 g. of the copolymer is obtained. The average polymerization velocity was 29.3 g/1/hr. The copolymer had an inherent viscosity of 0.16 dl/g., a Td of 216° C. and Tg of 43° C. The formulation comprises CTFE/CHMVE/EVE of 50:27:23 (in molar ratios).

In accordance with the process of Example 1, a paint is prepared with this copolymer and the paint is coated on an aluminum plate by spraying. An excellent spray pattern without webbing or sagging was observed; then the paint is cured at room temperature to provide a finish having a gloss of 81%.

EXAMPLE 9

In a 260 cc autoclave, 37.0 g. of t-butanol, 145 g. of CTFE, 27.2 g. of CHMVE, 24.5 g. of EVE and 0.127 g. of AIBN are charged and copolymerized under the condition of Example 1 at 65° C. for 3 hours to provide 152 g. of the copolymer product. The copolymer has an inherent viscosity of 1.05, Td of 231° C. and Tg of 39° C. and a formulation of CTFE/CHMVE/EVE of 50:16:34 (molar ratios).

The composition herein contains only primary hydroxyl groups because the presence of secondary hydroxyl groups in the vinyl ether component has been observed to lower the cure rate, which is undesirable. Furthermore it is critical that the composition herein includes both (b) and (c) vinyl ethers in the defined amounts, and in a total mole % equal to the fluoroolefin (a), so that a suitable coating can be obtained by the mixture of the hard component (b) and the soft component (a), without embrittlement of the coating, and in a mole ratio required for polymerization reaction between fluoroolefin and vinyl ethers.

While the invention has been described with particular reference to certain embodiments thereof, it will be understood that changes and modifications may be made which are within the skill of the art. Accordingly, it is intended to be bound only by the following claims, in which:

What is claimed is:

1. A rapidly curable fluorocopolymer composition to provide hard coatings without brittleness, and in a suitable mole ratio for copolymerization reaction between its components consisting essentially of (a) 40 to 60 mole % of fluoroolefin units, (b) 8 to 60 mole % of the monovinyl ether of cyclohexanedimethanol units containing primary hydroxyl groups only, and (c) 5 to 45 mole % of alkyl vinyl ether units, the mole % of (a) being substantially equal to (b) +(c).

2. The curable fluorocopolymer according to claim 1 wherein said fluoroolefin is a perhaloolefin.

3. The curable fluorocopolymer according to claim 2 wherein said perhaloolefin is chlorotrifluoroethylene or tetrafluoroethylene, or mixtures thereof.

4. The curable fluorocopolymer according to claim 1 wherein said alkyl vinyl ether has a $C_2$–$C_8$ straight or branched alkyl group.

* * * * *